United States Patent [19]

Wardle

[11] Patent Number: 4,958,331

[45] Date of Patent: Sep. 18, 1990

[54] TOWED SONAR RECEIVING ARRAY

[75] Inventor: William F. Wardle, Mystic, Conn.

[73] Assignee: The United States of America as represented by the Secretary of the Navy, Washington, D.C.

[21] Appl. No.: 446,573

[22] Filed: Feb. 25, 1974

[51] Int. Cl.$^5$ .............................................. G01S 15/00
[52] U.S. Cl. ..................................................... 367/130
[58] Field of Search ...................... 340/3 T, 6 R, 7 R; 367/130, 106, 20, 16; 114/292, 253

[56] References Cited

U.S. PATENT DOCUMENTS

| | | | |
|---|---|---|---|
| 3,491,848 | 1/1970 | Giles | 367/20 |
| 3,803,543 | 4/1974 | Cioccio et al. | 367/126 |

Primary Examiner—Thomas H. Tarcza
Assistant Examiner—Daniel T. Pihulic

[57] ABSTRACT

A mobile sonar surveillance system having a fully populated circular shaped horizontal receiving array steered in edgefired directions with overlapping coverage of beams. The array has a plurality of hydrophones randomly spaced and mounted on a series of parallel lines in the same horizontal plane and is suitable for towing by a single small ship. For alignment of a received signal one or more single beams suitable for rotation can be steered azimuthally with the proper set of synchronized variable delays. These beams will retain approximately the same parameters as they rotate.

8 Claims, 2 Drawing Sheets

4,958,331

TOWED SONAR RECEIVING ARRAY

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

Present mobile sonar arrays include two and three dimensional hull mounted arrays and towed linear arrays. Hull mounted arrays are generally mounted in the acoustically quiet bow area and can look effectively in all horizontal directions except toward the noisy stern. These hull mounted arrays are limited in size, particularly in the athwartship dimension by the dimensions of the ship on which they are installed. Towed linear arrays, on the other hand, are not limited by a vessel's size as long as they can be bent, folded or segmented for storage on the vessel. However, linear arrays can search effectively only in an angular segment centered on a line perpendicular to themselves. They have poor directivity in the important forward and aft directions. They have essentially no vertical directivity when steered in their otherwise optimum perpendicular directions.

Flag-like arrays of vertically separated lines have been proposed but, while they provide good vertical and horizontal directivities to beams which are perpendicular to their vertical plane, they also have poor end-fire directivity. Any array whose elements are confined to a vertical plane such as the linear arrays and the flag-like arrays will exhibit a left to right ambiguity in that it will not be possible to determine if a target is to the left or right of the array without the tow changing course.

A known array having horizontally separated lines for echo location of geological layers by seismic reflections has groups of transducers equally spaced from each other along identical parallel lines. In that array the hydrophones are positioned in a uniform rectangular grid that, while satisfactory for the detection of vertically oriented seismic signals, is not satisfactory as far as horizontally oriented sonar signals are concerned. Attempts to form beams in the edgefired directions with such uniformly spaced hydrophones result in a proliferation of high level side lobes which are detrimental to the signal detection function. In addition, the hydrophones in the grid-like pattern populate a rectangular area thus causing beams pointed in different horizontal directions to have different characteristics. Identification of signals is helped if one can compare the signals arriving from a series of uniform, uniformly spaced beams.

SUMMARY OF THE INVENTION

Accordingly it is a general purpose and object of the present invention to provide an improved transducer array. It is an additional object to provide a practical towing geometry for multiline sonar arrays that have approximately equal directivity in all horizontal directions. Further objects include that the system be compatible with practical shipboard handling procedures, suitable to be towed by a small ship and to be used in conjunction with a large projector. These and other objects of the invention and the various features and details of construction and operation will become apparent from the specification and drawings.

The above objects are obtained by providing an array of transducers arranged in a single horizontal plane. The transducers are attached to individual parallel lines and form a circle that is populated preferably in a staggered arrangement so as to provide approximately equal directivity in all directions. Paravanes and a line stabilizer are connected by spreader lines and form a triangular shape for supporting the lines holding the transducers.

DESCRIPTION OF THE PREFERRED EMBODIMENTS

Figure 1:
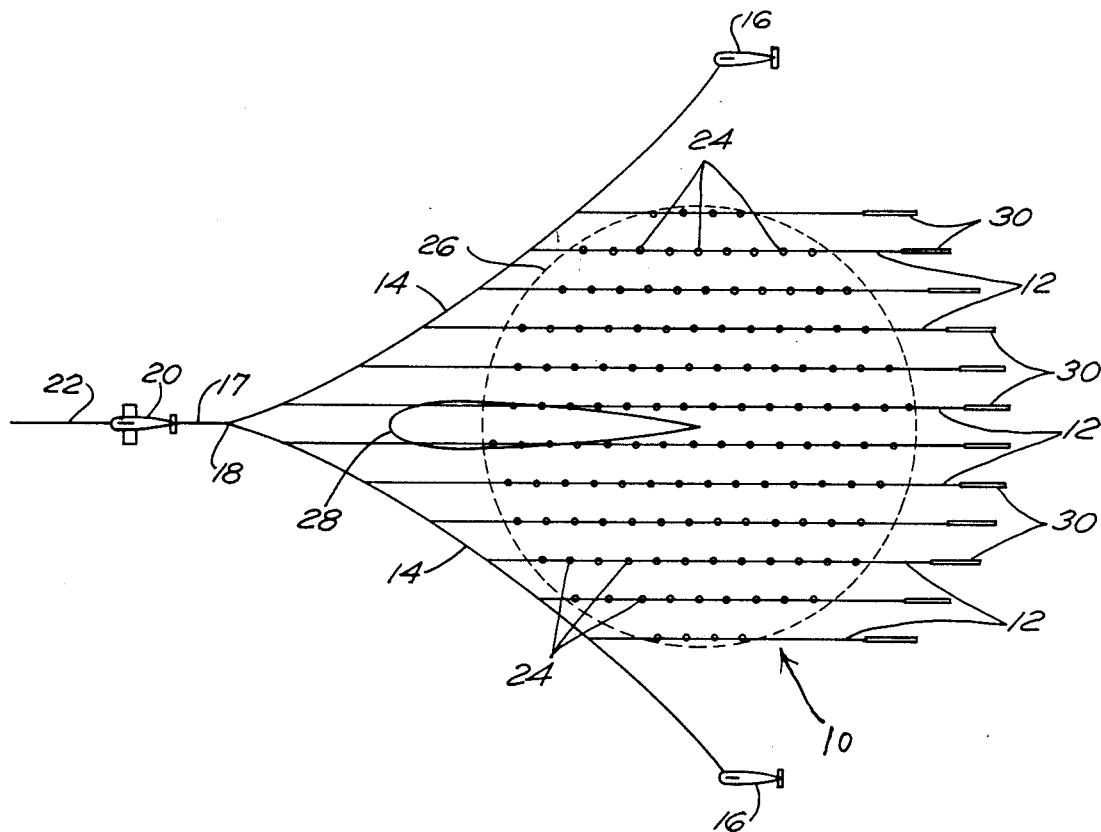
FIG. 1 is an overhead view of a towed array according to the present invention.

Referring now to the figures, and particularly to FIG. 1, there is shown an overhead view of a multiline planar array 10. The array 10 appears as it would when being towed, having a plurality of lines 12 parallely spaced from each other. A pair of spreader lines 14 having paravanes 16 at their aft ends hold the lines 12 separated in this parallel arrangement. Both spreader lines 14 are attached to tow line 17 at point 18. The tow line 17 runs forward and connects to a third paravane-like device termed a line stabilizer 20. The line stabilizer 20 connects at its forward end to tow line 22 which can be a portion of tow line 17. Tow line 22 extends in a forward direction to its point of attachment on the tow ship (not shown). The spreader lines 14 are kept stretched in the horizontal athwart direction by the forces exerted by two paravanes 16 wherein each paravane 16 is attached to the outer end of each spreader line 14. A plurality of hydrophones 24 are attached to the lines 12 and are enclosed within the area of a circle 26. The hydrophones 24 are preferably arranged in non-uniform rows within the circle 26 to prevent spiking of received signals. That is, the hydrophones 24 are non-uniformly spaced along each line 12 and the lines 12 can be non-uniformly spaced from one another. The hydrophones 24 are steered by a beam-former (not shown) in the edgefired or horizontal direction in a manner well known to those of skill in the art. A beam pattern 28 is shown for one beam steered in a direction parallel to the linear array 12. Enough individual beams could be formed to adequately search all horizontal directions. The lines 12, with their associated hydrophones 24, form individual linear arrays. The linear arrays arranged in parallel make the planar array 10 within circle 26. The planar array 10 in addition to hydrophones 24 contains the usual preamplifiers and communication channels for transmitting signals from the output of the preamplifiers along the lines 12 to their points of attachment to the spreader lines 14. Each spreader line 14, in addition to a strength member, contains a communication channel which conveys signals from the planar array to the communication channel in tow lines 17 and 22 for processing on shipboard.

Array stability depends in part on the stability of the three locations where tension forces are applied to keep the lines 12 spread in their operating geometry. They are forward point 18 where the spreader lines 14 are attached to tow line 17 and the outer ends of each spreader line 14 where paravanes 16 are connected. Both paravanes 16 and the line stabilizer 20 contain sufficient sensors and control functions to ensure that the array is maintained in a stable, horizontal position. The sensors include those which measure depth, attitude, spreader line angle, and distance between paravanes. These devices are well known to those of skill in the art and need not be explained further.

Figure 2:
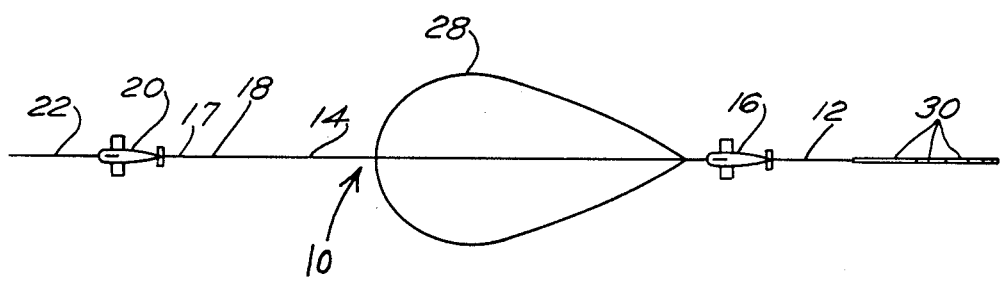
FIG. 2 is a side view of the array of FIG. 1.

The line stabilizer 20 functions to minimize any tow cable 17 transient motions such as might be imparted by undesirable ship motions so as to minimize the transients when they reach the lines 12. In addition, the line stabilizer 20 will assist in maintaining the depth of the forward end 18 of the array at some predetermined level, should the end of the tow cable 22 tend to raise or lower the forward part of the array from the depth being maintained by the paravanes 16. A balance of forces is established, particularly concerning the weight of tow line 22 and the hydrodynamic drag associated with the tow line 22 and the total array such that the vertical force which line stabilizer 20 exerts will usually be small. Similarly, the vertical forces exerted by paravanes 16 will tend to be small. Referring now to FIG. 2, there is shown a side view of the planar array 10 of FIG. 1. It is to be noted that lines 12 and drogues 30 extend aft of paravanes 16. These lines 12 in combination with their associated hydrophones 24 and drogues 30 should be made neutrally buoyant so that their depth may be controlled by paravane 16.

Figure 3:
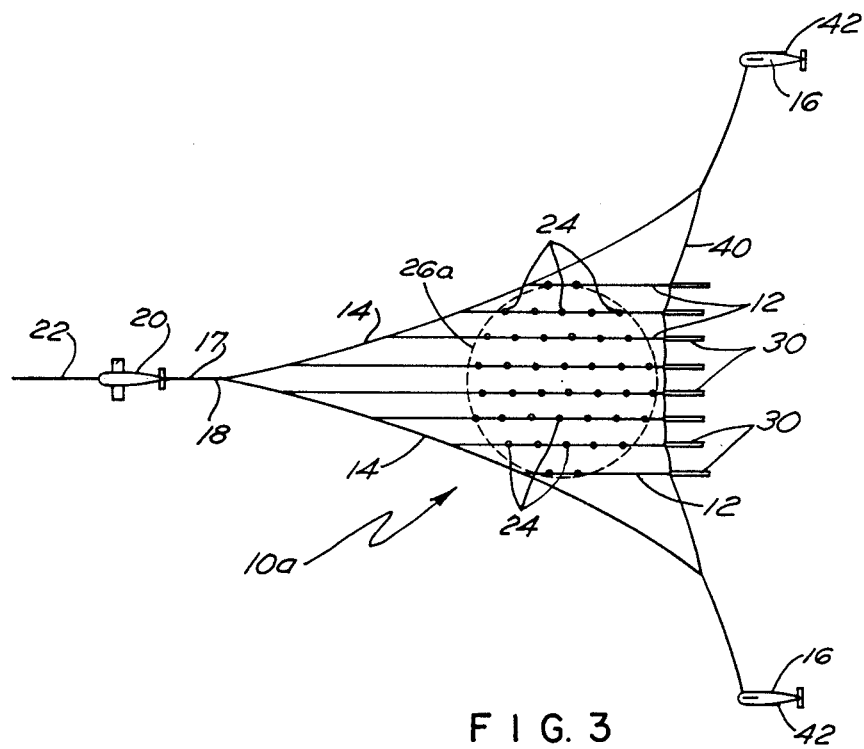
FIG. 3 is an embodiment in the towed configuration.
Figure 4:
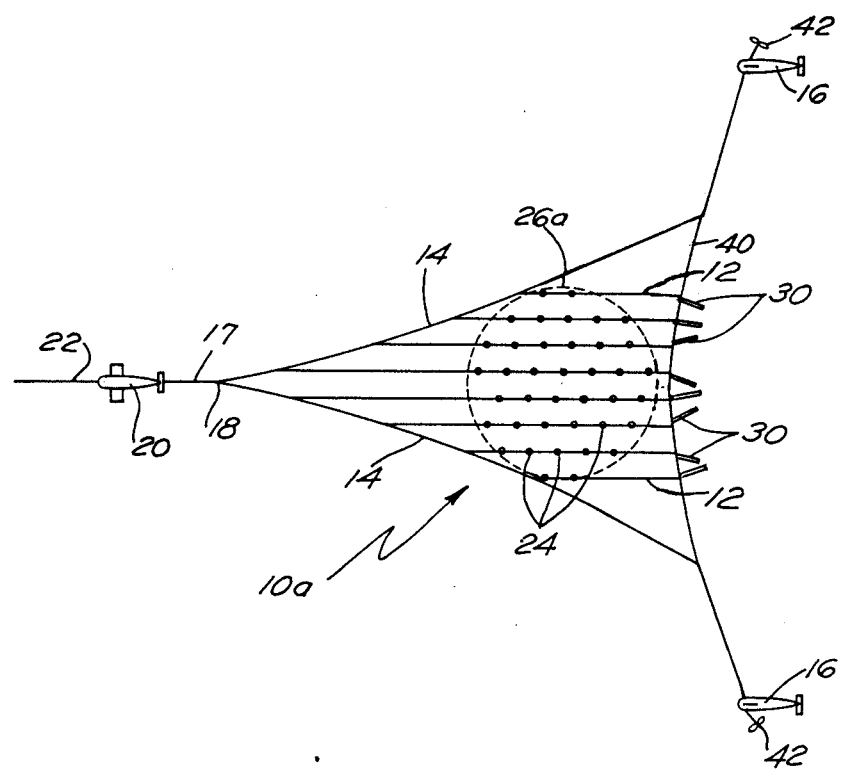
FIG. 4 is the embodiment of FIG. 3 at zero speed.

Referring now to FIGS. 3 and 4 wherein the same system is shown with FIG. 3 depicting the array 10a being towed and FIG. 4 showing the array 10a at zero speed. In both FIGS. 3 and 4 a small diameter faired or unfaired line 40 is installed across the back of the array 10a from one spreader line 14 to the other and is attached to the end of each individual line 12. Its purpose would be to maintain the array geometry in the zero speed mode when propulsion provided by a propeller 42 on paravane 16 is used to maintain tension on the spreader lines 14. This back line 40 maintains tension on the aft end of each line 12 and keeps the array 10a in a reasonable operating geometry. The individual lines 12 lengths are tailored to just stretch between the spreader lines 14 and the back line 40 to maintain the total geometry of the array in the zero speed condition. When being towed, the propeller 42 is folded to improve towing characteristics.

It should be noted in FIGS. 3 and 4 that the drogues 30 attached to the end of each line 12 are located to the rear of back line 40 so that they are not maintained in an operating geometry during a zero speed condition. As shown in FIG. 3, when speed is maintained the drogues 30 stream and perform their line stabilizing functions, but when the array stops, FIG. 4, they lose their orientation. However, they are short enough so they do not become entangled.

The zero speed option is important, not only from the desire to operate the sonar in this mode for tactical purposes but to prevent loss of the array geometry should the tow vessel have to stop for various causes such as main propulsion failure, a navigational hazard, or harassment. If no back line 40 is used, as might be the case in a high speed system, then it is only possible to keep spreader lines 14 stretched in an operating geometry, but not the lines 12 containing hydrophones 24. There is then the danger that lines 12 may become entangled.

In such an array, a circular 26a fully populated geometry may be used or additional hydrophones can be placed to fill in other portions of the lines.

There has therefore been shown an array configuration that allows beams of approximately equal directivity to be formed in all horizontal directions. This tends to lessen beam-former and post beam-former signal processing complexity since identical functions are performed on each beam. In addition, identical beams facilitate better beam to beam comparison in later data processing functions.

The array sizes represent a quantum jump in array dimensions as compared to hull mounted sonar arrays and provide the directivity needed for the utilization of low acoustic frequencies.

Steering the horizontal planar array in the edgefired direction produces a beam with a narrow horizontal beam with a somewhat broader vertical beam which, however, is adequate to reject much vertically oriented interference.

It will be understood that various changes in the details, materials, steps and arrangements of parts, which have been herein described and illustrated in order to explain the nature of the invention may be made by those skilled in the art within the principle and scope of the invention as expressed in the appended claims.

What is claimed is:

1. A sonar surveillance configuration suitable for towing comprising:
    a plurality of receiving devices arranged in a populated circle with random spacing between said receiving devices;
    control means connected to said receiving devices for maintaining the arranged configuration, said control means further comprises a pair of spreader lines connected to each other at one end, a pair of paravanes connected to the respective other ends of said spreader lines for positioning said spreader lines, and a plurality of spaced lines connected to said spreader lines and arranged so that said spaced lines are parallel to each other when towed; and
    towing means suitable for being connected to said control means.

2. A sonar surveillance configuration according to claim 1 wherein said receiving devices comprise hydrophones randomly spaced on said spaced lines.

3. A sonar surveillance configuration according to claim 2 wherein said towing means further comprises:
    a tow line connected to said one ends of said spreader lines; and
    a line stabilizer connected to said tow line.

4. A sonar surveillance system according to claim 3 wherein said control means further comprise drogues connected to the aft end of said spaced lines.

5. A sonar surveillance configuration according to claim 1 wherein said control means further comprises:
    a back line connected to said pair of spreader lines and the aft end of said spaced lines; and
    said paravanes include propulsion means for operation at zero speed.

6. A sonar surveillance configuration according to claim 5 wherein said receiving devices comprise hydrophones randomly spaced on said spaced lines.

7. A sonar surveillance configuration according to claim 6 wherein said towing means further comprises:
    a tow line connected to said one ends of said spreading lines; and
    a line stabilizer connected to said tow line.

8. A sonar surveillance system configuration according to claim 7 wherein said control means further comprise drogues connected to the aft end of said spaced lines.

* * * * *